United States Patent [19]

Jenkins

[11] Patent Number: 4,719,259

[45] Date of Patent: Jan. 12, 1988

[54] PROCESS FOR PRODUCING ETHYLENE/VINYL ALCOHOL COPOLYMERS

[75] Inventor: Waylon L. Jenkins, Kingsport, Tenn.

[73] Assignee: Eastman Kodak Company, Rochester, N.Y.

[21] Appl. No.: 727,982

[22] Filed: Apr. 29, 1985

[51] Int. Cl.$^4$ .............................................. C08F 16/06
[52] U.S. Cl. .................................................. 525/60
[58] Field of Search ............................................ 525/60

[56] References Cited

U.S. PATENT DOCUMENTS

| | | | |
|---|---|---|---|
| 2,467,774 | 2/1945 | Plambeck | 525/60 |
| 3,426,107 | 2/1969 | Scruggs et al. | 525/60 |
| 3,523,933 | 8/1970 | Inskip | 525/60 |
| 3,560,461 | 2/1971 | Yonezu et al. | 525/61 |
| 3,847,845 | 11/1974 | Tada et al. | 525/60 |
| 4,041,223 | 8/1977 | Amemiya et al. | 525/60 |
| 4,367,305 | 1/1983 | Satoh et al. | 525/60 |

FOREIGN PATENT DOCUMENTS

| | | | |
|---|---|---|---|
| 57-13858R | 4/1972 | Japan | 525/60 |
| 634140 | 3/1950 | United Kingdom | 525/60 |

*Primary Examiner*—Joseph L. Schoffer
*Assistant Examiner*—J. M. Reddick
*Attorney, Agent, or Firm*—John F. Stevens; William P. Heath, Jr.

[57] ABSTRACT

Described is a process for the preparation of ethylene/vinyl alcohol copolymers with low residual acetate content and low ash levels, and in a form that is easily pelletized. Such polymers have good thermal stability and excellent barrier properties.

12 Claims, No Drawings

PROCESS FOR PRODUCING ETHYLENE/VINYL ALCOHOL COPOLYMERS

TECHNICAL FIELD

This invention relates to a process for the preparation of ethylene/vinyl alcohol copolymers with low residual acetate content and low ash levels, and in a form that is easily pelletized. Such polymers have good thermal stability and excellent barrier properties.

BACKGROUND OF THE INVENTION

Ethylene/vinyl alcohol copolymers containing from about 25 mol % to about 45 mol % ethylene have excellent properties for packaging applications. These polymers are normally produced from the corresponding ethylene/vinyl acetate copolymers. The presence of residual acetate moieties adversely affects the barrier properties of ethylene/vinyl alcohol copolymers. Therefore, it is necessary to reduce the acetate groups to as low a concentration as possible. Conditions for producing polyvinyl alcohol from polyvinyl acetate are well-documented in the literature, but low residual acetate levels are not usually very important for polyvinyl alcohol. Two mol % acetate is commonly considered to be a high degree of hydrolysis. In addition, the solubility characteristics and reactivity of ethylene/vinyl acetate copolymers are quite different from those of polyvinyl acetate. Accordingly, different technology is needed to produce ethylene/vinyl alcohol copolymers with the required low content of residual acetate. Furthermore, in order for these polymers to have the thermal stability required for melt processing, it is important to produce polymer with very low residual catalyst residues. The basic catalysts that are typically used also catalyze decomposition reactions that result in discoloration, gas evolution, and gelation at melt processing temperatures. Because these catalysts are generally alkali metal salts (e.g., NaOH), the ash content after combustion can be taken as a measure of the level of catalyst residues present in the polymer. High ash levels are correlated with poor thermal stability. This invention provides a process for the preparation of ethylene/vinyl alcohol copolymer with very low residual acetate content and ash content.

Patents of interest include the following:

U.S. Pat. No. 3,560,461 describes a process for the production of ethylene/vinyl alcohol copolymers by countercurrently contacting an ethylene/vinyl acetate polymer solution with alcohol vapor in an amount sufficient to affect the saponification and remove the acetic acid ester by-product as overhead from the reaction tower. Methanol is the preferred solvent, and a strong base catalyst is used. The examples illustrate the use of caustic soda at concentrations between 3.9 and 9.8% relative to the weight of the ethylene/vinyl acetate polymer. The products of the examples contain between 0.8 and 1.7 mol % residual acetate groups. This process is a continuous process requiring a pressurized column and high temperatures to keep the ethylene/vinyl alcohol polymers in solution. If the polymers precipitate during the reaction, buildup of the polymer in the tower is likely, and it is unlikely that very low residual acetate levels would be achieved. This patent makes no mention of neutralization of catalyst residues.

U.S. Pat. No. 3,847,845 describes a process for the separation and purification of ethylene/vinyl alcohol polymers. The process includes mixing water with an anhydrous methanol soution of an ethylene/vinyl alcohol polymer after the saponification has reached the desired degree of completion. The resultant solution is extruded into an aqueous coagulation bath to form a microporous sheet or strand which is then washed with water to remove catalyst residues. The sheet or strand is then dried. In this process, the polymer is dissolved and the resulting solution is extruded. Catalyst residues are removed by washing the sheet without any prior neutralization. The polymer is isolated by precipitation in a coagulation bath.

U.S. Pat. No. 4,041,223 relates to a process for preparing hydrolyzed ethylene/vinyl acetate polymers having improved thermal stability. The process includes a first-stage reaction in methanol to a degree of hydrolysis of greater than 90 mol %. A secondary hydrolysis in water is used to achieve a degree of hydrolysis greater than 97 mol %. An acid may be added to the polymer suspension to neutralize the catalyst. The ethylene/vinyl alcohol polymer is isolated between the first and second-stage reactions and the methanol content is reduced to less than 15% by weight before slurrying in water. An acid may be added to the suspension to neutralize residual catalyst after completion of the reaction. The polymer is then contacted with a solution of a phosphoric acid to provide further stability. This process includes a drying step between the first and second stages. The examples demonstrate degrees of hydrolysis between 99.0 and 99.5% after the second stage. The polymer is produced in the form of a powder after drying.

U.S. Pat. No. 4,367,305 describes saponified ethylene/vinyl acetate polymers improved in behavior in the molten state. The improvements are achieved by immersing the polymer in a solution of water-soluble manganese and/or copper salts and an acid with a pKa between 3.5 and 6.5 to produce a polymer with between 0.00005 and 0.005% by weight manganese or copper. The polymer must also give an extract with a pH between 3.5 and 6.5 when extracted with 100 mL of water per 20 g polymer. The examples discuss a saponification reaction conducted at 110° C. in methanol under a pressure of 3.5 kg/cm$^2$ while distilling off methyl acetate. The ethylene/vinyl alcohol polymer product has a saponification degree of 99.2%. Water is introduced after the reaction is completed and a paste-like liquid is extruded into a coagulation bath. The pellets are then washed and treated with dilute acetic acid and an aqueous solution of manganese (II) acetate and dried.

DISCLOSURE OF THE INVENTION

This invention is concerned with a process for the production of ethylene/vinyl alcohol copolymers containing between 20 and 50 mol % ethylene repeat units, less than 0.5 mol % vinyl acetate repeat units and residual ash content from residual catalyst of less than 0.05%. The process includes a two-stage reaction in which the first reaction is a base-catalyzed ester-interchange reaction in a lower alcohol such as methanol. As the reaction proceeds, the polymer precipitates, after which it is collected by filtration and washed to remove the alcohol acetate. Alternatively, the alcohol acetate can be removed by distillation. The polymer at this point typically has about 3 mol % vinyl acetate repeat units. The polymer is then dissolved by adding the appropriate amount of water to dissolve the polymer at 60° C. The alcohol/water ratio required depends on the polymer composition. The second-stage reaction is thus performed in a homogeneous mixture which improves the reactivity of the acetate groups. The reaction is driven to completion by reaction of the ester groups with the base to produce a salt. After the mol % vinyl acetate repeat units are reduced to less than 0.5 mol %, the reaction mixture is neutralized with acetic acid (or another weak acid with a similar pKa) before precipitating the polymer. The polymer is precipitated by adding additional water to the solution, or by adding the solution to water. The polymer precipitates as a soft dough which can be easily extruded and pelletized at low temperatures. The polymer can be washed either before or after pelletization. The process offers a means of producing an ethylene/vinyl alcohol polymer extremely low in both residual acetate groups and ash without resorting to elevated temperatures and pressures. The process does not require the use of a pressure vessel, and produces high-quality product.

According to this invention, there is provided a method of producing copolymers of ethylene and vinyl alcohol having less than 0.5 mol % vinyl acetate repeat units and an ash content from residual catalyst of less than 0.05% comprising (a) forming a solution of ethylene/vinyl acetate copolymer containing about 20–50 mol % of ethylene repeat units in an alcohol having 1 to 8 carbon atoms, (b) introducing a catalytic amount of a base catalyst into the solution, (c) reacting the ethylene/vinyl acetate copolymer with the alcohol to form ethylene/vinyl alcohol copolymer and the acetate of the alcohol, (d) removing the acetate, (e) adding water to the reaction mixture to form an alcohol/water solvent for said copolymer, (f) adjusting the concentration of base to a point where the number mols of base is at least as great as the number mols of acetate in the copolymer to further hydrolyze the acetate groups remaining in the copolymer to an acetate content of less than 0.5%, (g) neutralizing the reaction mixture to a pH of about 5–7, and (h) precipitating and isolating the polymer.

The starting copolymer, ethylene/vinyl acetate, is produced by means known in the art, such as for example:

1250 grams of vinyl acetate monomer is charged to a one-gallon stainless steel autoclave equipped with an internal cooling coil and agitation means. The vessel and contents are cooled to 15° C. by circulating cold water in the cooling coil. 1.125 grams of solid isopropyl percarbonate is added to 1250 grams of vinyl acetate previously cooled to −40° C. The percarbonate dissolves readily with gentle agitation and the solution is then poured into the autoclave. The autoclave is pressurized while maintaining agitation, with 100 p.s.i.g. (7.03 kg/cm² gage) ethylene and then vented to zero p.s.i.g. (atmospheric presure). The autoclave is purged twice again in the same manner in order to remove any oxygen from the autoclave and its contents. Then the reaction temperature is increased to 45° C. by means of an external electrical heating mantle; the pressure is 100 p.s.i. (7.03 kg/cm²) before heating and additional ethylene is added to bring the pressure to 450 p.s.i. (31.6 kg/cm²) simultaneously with the temperature rise to 45° C. The reaction temperature is controlled between 45° and 46° C. The autoclave is vented several times during the run in order to maintain a constant pressure of 450 p.s.i.g. (31.6 kg/cm²). The cooling of the monomer and the simultaneous increase in temperature and pressure is carried out to avoid any premature polymerization that would result in any homopolymer segments. After four hours reaction time a monomer conversion of 35.8% is achieved and the autoclave contents are cooled rapidly to 20° C. without venting of pressure and the contents are dumped into two volumes of methanol containing 0.1% by weight of inhibited styrene monomer which process acts to rapidly quench the polymerization process and avoid residual polymerization that may produce segments of homopolymer. The ethylene/vinyl acetate resin is recovered within 24 hours by disintegration of the varnish into several volumes of hexane. The resin, which is dried overnight at 75° C., has an ethylene content of 13.5% by weight and a viscosity number of 0.763 dl./g. in toluene (0.25 g./100 ml.) at 25° C.

The ethylene/vinyl acetate polymer concentration in (a) should be between about 20 and 50% by weight in alcohol. If the concentration is too low, the product tends to precipitate as small particles which are difficult to filter. If the concentration is too high, the viscosity is too great to handle and the polymer suspension that results from the reaction is a paste too thick to stir. The optimal concentration is dependent on the composition of the ethylene/vinyl acetate polymer, but for a polymer containing about 30 mol % ethylene a concentration of about 25 to 30% by weight is preferred.

Methanol is the preferred alcohol solvent.

The catalyst is a base selected from alkali metal hydroxides or alkoxides. Sodium hydroxide is preferred. The base is added in a concentration between 2 and 6 mol % relative to acetate groups in the first stage. Low concentrations result in a slow reaction, and high concentrations produce excessive salts which must be removed from the product.

The reaction temperature should be between 25° and 125° C. At low temperatures, the reaction is very slow, and high temperatures may produce unwanted side reactions. When using methanol, a temperature of about 55° C. is preferred for the first reaction since it represents the maximum temperature without resorting to pressurized equipment. The second stage may be conducted at a higher temperature (about 70°–85° C.) due to the higher boiling points of methanol/water mixtures. Again, higher temperatures may be used if a pressure vessel is used as the reactor.

Removal of the acetate of the alcohol may be conveniently accomplished by means well known in the art, such as by washing or by distillation.

As the next step, the polymer is dissolved by adding water, thereby forming a mixture of alcohol and water in a ratio of between about 80:20 and 20:80. The polymer is soluble in this mixture, but not in the alcohol alone.

When the polymer has dissolved in the alcohol/water mixture, the concentration of the base (which was used as catalyst in the first stage) is adjusted such that the number mols of base is at least as great as the number mols of acetate in the copolymer. By "adjusted", it is meant that the pH is checked and more base added, if necessary. However, it may be found that sufficient base is already present, in which case addition of more base is unnecessary. This initiates the second stage of the reaction to further hydrolyze the acetate groups remaining in the copolymer. In the second stage, an amount approximately equal to the first catalyst charge is added. The reaction mixture is checked to be sure that the pH remains above 10 throughout the reaction. After the second stage is completed, the pH is reduced to between 5 and 7 for optimum thermal stability of the product. A weak acid, preferably acetic acid, is preferred to reduce the probability of lowering the pH below 5. However, other acids may be used. The solvent composition preferred for the second-stage reaction and the conditions for precipitation of the ethylene/vinyl alcohol polymer are composition-dependent, and will be illustrated in the examples which follow. This reaction is allowed to continue until an acetate content of less than 0.5% mol % is reached. During this reaction, the ester groups of the ethylene/vinyl acetate/vinyl alcohol react with the base to form a salt. If sodium hydroxide has been used, the salt is sodium acetate. Thus, in the first stage of the reaction, the base (in this case, sodium hydroxide) acts as a catalyst and is not consumed. In the second stage, the base enters into the reaction and is consumed.

Suitable acids for neutralization include those with pK's between 1 and 6. Acetic acid is preferred.

The polymer is next precipitated as a dough by the addition of sufficient water to overcome the solvating ability of the alcohol/water mixture, washed with water (conveniently in a mixer) and isolated by conventional means. The polymer, having an I.V. of about 0.8-1.5, then may be extruded and pelletized by conventional means.

The following examples are submitted for a better understanding of the invention.

EXAMPLE 1

This example illustrates the desirable results of completing the reaction of an ethylene/vinyl acetate copolymer in a methanol/water mixture and isolating the resulting ethylene/vinyl alcohol polymer by addition of water. An ethylene/vinyl alcohol copolymer is prepared from an ethylene/vinyl acetate polymer by the following procedure. A 25% solution of an ethylene/vinyl acetate polymer containing about 30 mol % ethylene repeat units is heated to 55° C. The reaction is catalyzed by the addition of 5 mol % NaOH based on the acetate groups present. During the reaction, the polymer precipitates. After collecting the polymer by filtration, the polymer is washed with methanol followed by water. The product is a wet cake of white polymer. At this point the polymer typically contains 2 to 3 mol % vinyl acetate repeat units. The filter cake is 11.3% solids. Methanol is added to produce a solution of the polymer in a 50/50 methanol/water mixture. An additional 4 mol % NaOH based on the original ethylene/vinyl acetate composition is added, and the reaction is stirred overnight at 55° C. The pH of the solution is greater than 11. Acetic acid is added to neutralize the solution. The ethylene/vinyl alcohol polymer is precipitated by adding to excess water. A soft, easily worked dough results. The dough is washed twice with 5 parts water at 23° C. and once with 5 parts water at 65° C. After drying a sample, there is no acetate detected by a method with a lower detection limit of less than 0.1 mol %. Also, there is no ash detected. The dough is fed to an extruder heated to a temperature of about 80° C. During the extrusion, the dough is partially dewatered, and a strand is produced which is chilled in a water bath and pelletized. The pellets are white, and upon drying at 120° C. they shrink and become transparent.

EXAMPLE 2

Comparative Example

Second Stage in Methanol—The procedure of Example 1 is followed through the isolation of the polymer from the first-stage transesterification. The polymer is then reslurried in methanol with an additional 5 mol % NaOH based on the ethylene/vinyl acetate polymer composition. The polymer is collected by filtration and washed twice with seven parts methanol and twice with seven parts water before drying. The ethylene/vinyl alcohol copolymer contains 0.5 mol % vinyl acetate repeat units, and the ash content is 0.36%.

EXAMPLE 3

Comparative Example

Second Stage in Water—The procedure of Example 1 is followed through the washing of the polymer from the first stage reaction. The polymer is then reslurried in nine parts water with an additional 6 mol % NaOH based on the original ethylene/vinyl acetate composition. After stirring overnight at 50° C., the product is collected by filtration, washed with water, and dried. The product contains 1.1 mol % vinyl acetate repeat units.

EXAMPLE 4

Importance of Neutralization to Improve Thermal Stability and Reduce Ash—A 750 g sample of wet ethylene/vinyl alcohol polymer is divided into six parts. Each part contains 25 g polymer and 100 g water. Each part is dissolved by adding 100 g methanol and heating to 50° C. To each part, 1 g of NaOH is added to represent an amount equal to 5 mol % relative to the acetate content in the original ethylene/vinyl acetate polymer. Various amounts of acetic acid are added as shown in Table 1. The polymer samples are isolated by adding to water and washing with water five times before drying. Incomplete neutralization results in discoloration of the polymer, a reduction of I.V., and higher ash levels (Table 1).

TABLE 1

| | Effect of Neutralization on Ash, I.V., and Film Appearance | | |
|---|---|---|---|
| CH$_3$COOH/NaOH | Ash | I.V. (After Molding)$^a$ | Film Appearance$^a$ |
| 0:1 | 0.38% | 1.381 | Very yellow |
| 0.5:1 | 0.36% | 1.395 | Very yellow |
| 0.75:1 | 0.06% | 1.4511 | Light yellow |
| 1:1 | 0.056% | 1.475 | Light yellow |
| 1.5:1 | 0.006% | 1.487 | Colorless with light yellow patches |
| 2:1 | 0.004% | 1.512 | Colorless with light yellow patches |

$^a$Film pressed at 225° C. with 1 minute degassing and 1 minute pressing at 8000 PSI.

Residual acetate content is determined by NMR.

Ash content of the copolymer is determined according to the following procedures:

(1) Weigh approximately 1.0 g. (+0.00001 g.) sample into a previously weighed porcelain crucible.

(2) Gradually heat in air in a muffle furnace up to 600° C. and maintain for 2 hrs.

(3) Cool crucible and weigh.

(4) Repeat heating at 600° C. for 2 hrs.

(5) Cool and reweigh. Repeat steps 4 and 5 until constant weight (+0.00005 g) is obtained.

Whenever the term "inherent viscosity" (I.V.) is used in this application, it will be understood to refer to viscosity determinations made at 25° C. using 0.50 gram of polymer per 100 ml of a solvent composed of 60 percent phenol and 40 percent tetrachloroethane.

The invention has been described in detail with particular reference to preferred embodiments thereof, but it will be understood that variations and modifications can be effected within the spirit and scope of the invention.

I claim:

1. The method of producing copolymers of ethylene and vinyl alcohol having less than 0.5 mol % vinyl acetate repeat units and an ash content from residual catalyst of less than 0.05% comprising
   (a) forming a solution of ethylene/vinyl acetate copolymer containing about 20–50 mol % of ethylene repeat units in an alcohol having 1 to 8 carbon atoms,
   (b) introducing a catalytic amount of a base catalyst into said solution,
   (c) reacting said ethylene/vinyl acetate copolymer with said alcohol to form ethylene/vinyl alcohol copolymer and the acetate of said alcohol,
   (d) removing said acetate,
   (e) adding water to the reaction mixture to form an alcohol/water solvent for said copolymer to completely dissolve the compolymer,
   (f) adjusting the concentration of base to a point where the number mols of base is at least as great as the number mols of acetate in the copolymer to further hydrolyze the acetate groups remaining in said copolymer to an acetate content of less than 0.5 mol %,
   (g) neutralizing the reaction mixture to a pH of about 5–7, and
   (h) precipitating and isolating the polymer.

2. Process according to claim 1 wherein the alcohol solvent is methanol.

3. Process according to claim 1 wherein the basic catalyst is an alkali metal hydroxide or alkali metal alkoxide.

4. Process according to claim 3 wherein said basic catalyst is sodium hydroxide.

5. Process according to claim 1 wherein the reaction of step (c) is carried out at about atmospheric pressure and below the boiling point of said alcohol.

6. Process according to claim 1 in which the base added in step (f) is the same as the base catalyst added in step (b).

7. Process according to claim 1 wherein said acetate in step (d) is removed by distillation.

8. Process according to claim 1 wherein said polymer is collected by filtration prior to removal of said acetate in step (d) and the acetate is removed by washing.

9. Process according to claim 1 wherein the hydrolysis in step (f) is conducted at about atmospheric pressure and below the boiling point of the solvent.

10. Process according to claim 1 in which the reactions in steps (c) and (f) are conducted at a pH greater than 10.

11. Process according to claim 1 in which the catalyst charge in step (b) is about 2–6 mol % based on the mol % of acetate groups of the copolymer.

12. Process according to claim 1 in which the strong base added in step (f) is the same as, and approximately the same quantity as, the catalyst added in step (b).

* * * * *